United States Patent [19]

Wakamatsu et al.

[11] Patent Number: 5,683,141
[45] Date of Patent: Nov. 4, 1997

[54] SEAT HEAD REST FOR VEHICLE

[75] Inventors: Fumio Wakamatsu, Okazaki; Nobuhiko Takeda, Nukata-gun; Hideo Nihonmatsu, Chiryu, all of Japan

[73] Assignee: Aisin Seki Kabushiki Kaisha, Kariya, Japan

[21] Appl. No.: 644,865

[22] Filed: May 10, 1996

[30] Foreign Application Priority Data

May 12, 1995 [JP] Japan ................................. 7-114885
Oct. 27, 1995 [JP] Japan ................................. 7-281039

[51] Int. Cl.$^6$ ................................................ A47C 1/10
[52] U.S. Cl. ................................ 297/408; 297/396
[58] Field of Search ............................ 297/408, 396, 297/391, 403

[56] References Cited

U.S. PATENT DOCUMENTS

| 3,948,562 | 4/1976 | Grabner et al. | 297/408 |
| 4,840,428 | 6/1989 | Kobayashi | 297/408 |
| 4,844,544 | 7/1989 | Ochiai | 297/408 |
| 4,861,107 | 8/1989 | Vidwans et al. | 297/408 |
| 4,991,907 | 2/1991 | Tanaka | 297/408 |
| 5,316,372 | 5/1994 | Amner | 297/408 |
| 5,443,303 | 8/1995 | Bauer et al. | 297/408 |

FOREIGN PATENT DOCUMENTS 4-14045  3/1992  Japan .

*Primary Examiner*—Laurie K. Cranmer
*Attorney, Agent, or Firm*—Finnegan, Henderson, Farabow, Garrett and Dunner, L.L.P.

[57] ABSTRACT

A seat head rest for a vehicle includes a stay member for being mounted on a seat back, a rigid frame pivotably mounted on the stay member and a pad member fixed to the rigid frame forming a head rest body with the rigid frame, wherein the rigid frame further includes a frictional portion which is integrally formed with the rigid frame and which frictionally engages the stay member.

12 Claims, 14 Drawing Sheets

5,683,141

SEAT HEAD REST FOR VEHICLE

BACKGROUND OF THE INVENTION

1. Field of the Invention

This invention relates to a seat head rest for a vehicle.

2. Description of the Related Art

A conventional seat head rest for a vehicle is disclosed in the Japanese Utility Model No. 4(1992)-14045. The disclosed seat head rest for a vehicle comprises a stay member mounted on a seat back, a rigid frame pivotably mounted on the stay member and a pad member fixed to the frame forming a head rest body with the frame. It further comprises a pair of friction members fixed to the frame so that the head rest body can be pivotally mounted on the stay member by frictional engagement between each of the friction members and the stay member. Further, a pivot angle of the head rest body relative to the stay member is limited by engagement between a stopper member fixed to the stay member and the frame.

However in the prior art, because the seat head rest for a vehicle includes the additional friction members, there is a substantial increase in cost.

Further, since friction forces between each of the friction members and the stay member can not vary, a resistance force of the head rest body is constant when the head rest body is moved back and forth.

In light of the foregoing there is a need for a head rest for a vehicle that operates as effectively as those heretofore developed, but which can be manufactured at a lower cost.

SUMMARY OF THE PRESENT INVENTION

Accordingly, the present invention is directed to a seat head rest for a vehicle that is lower in cost, simple in structure, and relatively small in size.

Additional features and advantages of the invention will be set forth in the description which follows, and in part will be apparent from the description, or may be learned by practice of the invention. The objectives and other advantages of the invention will be realized and attained by the device particularly pointed out in the written description and claims hereof as well as the appended drawings.

To achieve these and other advantages and in accordance with the purpose of the invention as embodied and broadly described, a seat head rest for a vehicle in accordance with this invention comprises a stay member for being mounted on a seat back, a frame pivotably mounted on the stay member and a pad member fixed to the frame forming a head rest body with the frame, wherein the frame further includes a friction portion which is integrally formed with the frame and which frictionally engages the stay member.

It is to be understood that both the foregoing general description and the following detailed description are exemplary and explanatory and are intended to provide further explanation of the invention as claimed.

BRIEF DESCRIPTION OF THE DRAWINGS

The features and advantages of the seat head rest for a vehicle according to the present invention will be more clearly appreciated from the following description in conjunction with the accompanying drawings wherein.

DETAILED DESCRIPTION OF PREFERRED EMBODIMENTS OF THE INVENTION

Figure 1:
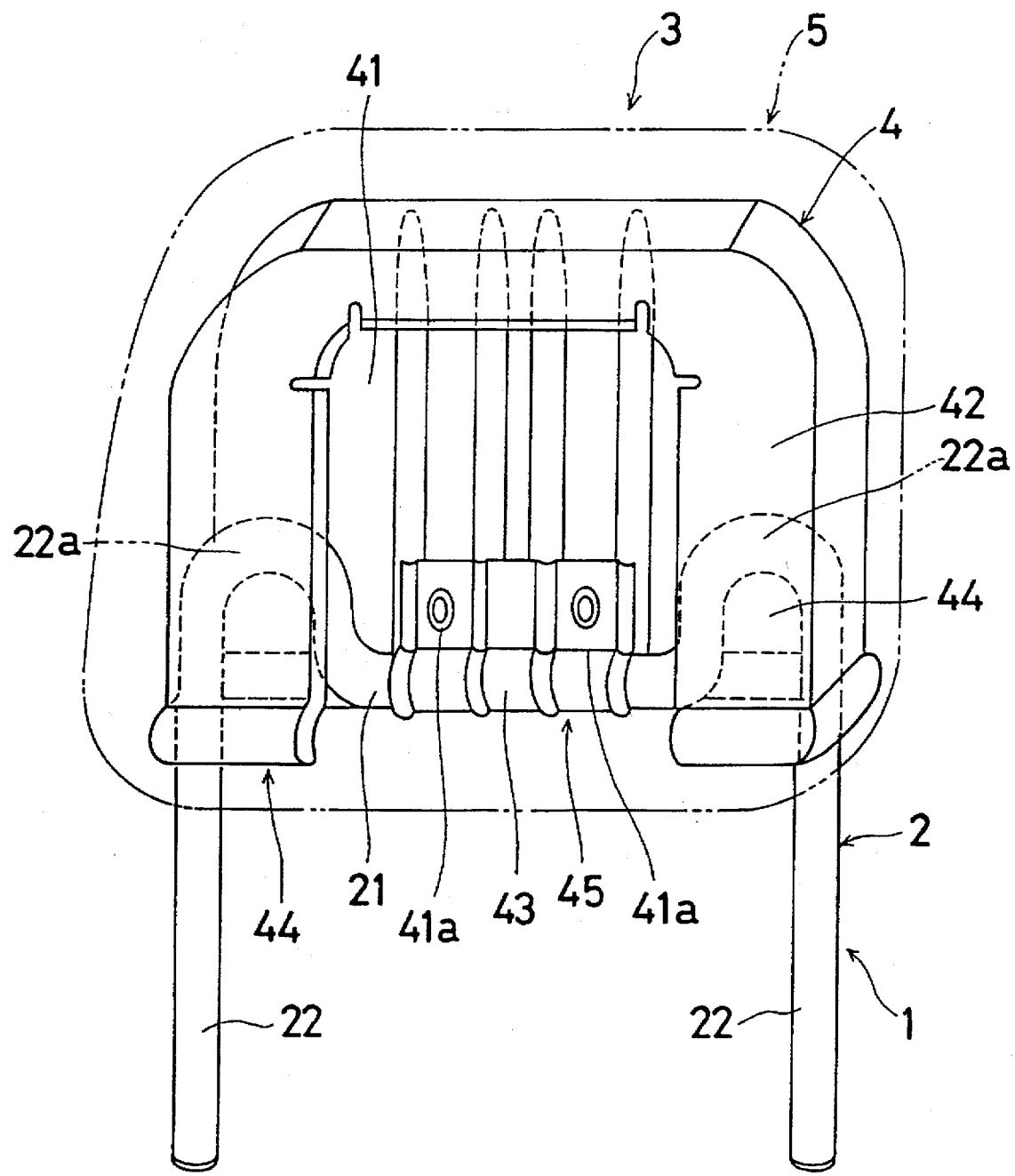
FIG. 1 a perspective view of a seat head rest for a vehicle according to a first embodiment of the present invention.

In accordance with FIGS. 1, 8, 11 and 13, a seat head rest for a vehicle 1 for supporting a head of a passenger who sits on a vehicle seat (not shown) comprises a stay member 2 and a head rest body 3. The stay member 2 for mounting the head rest body 3 on a seat back (not shown) of the vehicle seat includes a horizontal rod portion 21 and a pair of vertical rod portions 22 integrally formed with the horizontal rod portion 21 to form a U-shaped configuration. The horizontal rod portion 21 and the vertical rod portions 22 are made from a rod having a substantial circumference. The vertical rod portions 22 are mounted on the seat back.

The head rest body 3 includes a rigid frame 4 and a pad member 5, as a cushion member, covering the rigid frame 4. The pad member 5 is made by an insert mold.

Figure 2:
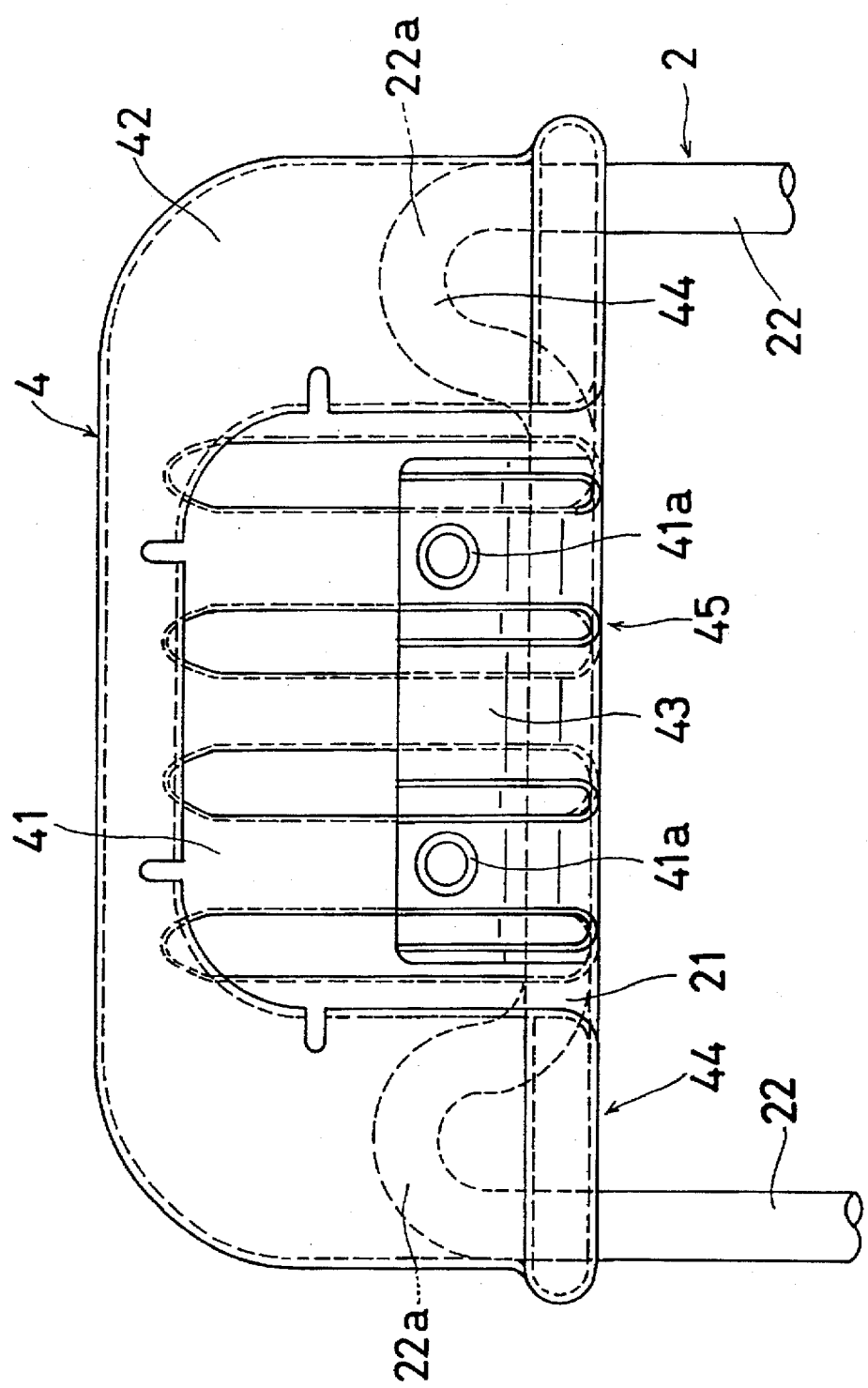
FIG. 2 is an elevational view of FIG. 1.
Figure 3:
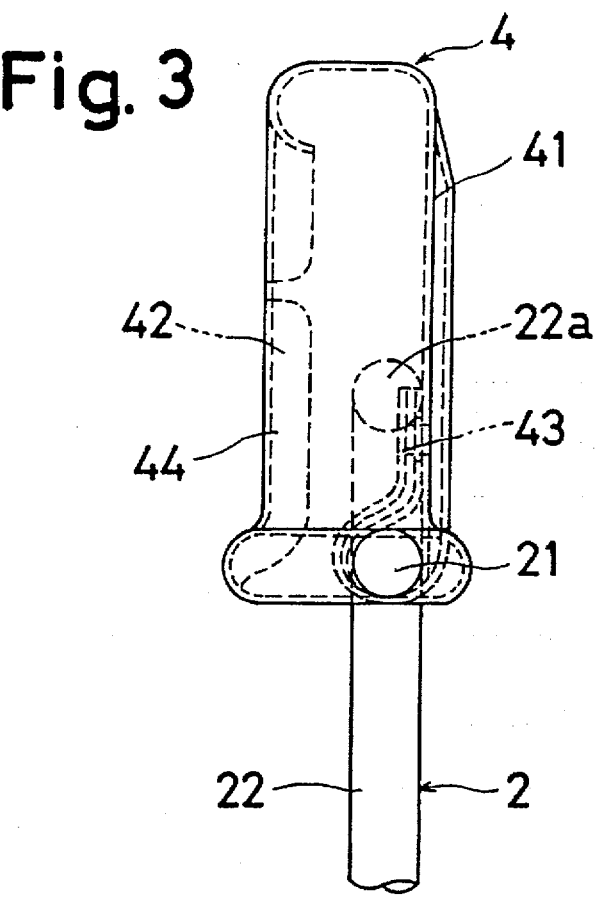
FIG. 3 is a side view of FIG. 1.

Referring to FIGS. 1 to 3, the first embodiment of the head rest body 3 will be mentioned in detail. The rigid frame 4 which is formed from a plate member includes a body portion 41, a first extension portion 42 extending from an upper portion, and a pair of side portions of the body portion 41 are integrally formed with a second extension portion 43 extending from a lower portion of the body portion 41. The first extension portion 42 is bent in the forward direction of the seat head rest 1 so as to form the frame 4 into a box shape without an edge portion. Therefore, the pad member 5 can be made by the insert mold to cover the frame 4. The second extension portion 43 is curled around the rod 21 in the forward direction of the seat head rest 1.

The stay member 2 includes a pair of stopper portions 22a integrally formed with the vertical rod portions 22 and connected to the horizontal rod portion 21. The stopper portions 22a project in the upper direction from an axis of the horizontal rod portion 21.

Upper portions of the vertical rod portions 22 with the stopper portions 22a are covered by the extension portion 42 of the frame 4. The supporting portion 43 of the frame 4 is wound around the horizontal rod portion 21 to mount the frame 4 on the stay member 2.

A clearance between the body portion 41 and the extension portion 42 in the forward and rear direction of the seat head rest 1 is larger than thicknesses of the stopper portions 22a. A frictional portion 45 of the extension-portion 43 frictionally engages the horizontal rod portion 21.

The head rest body 3 is pivotally mounted on the stay member 2. Further, the extension portion 42 includes a pair of wall portions 44 engageable with the stay member 2 by the rotation of the head rest body 3 relative to the stay member 2. When the pad member 5 is formed by the insert mold, the wall portions 44 may be filled with another material or covered with anything in order to prevent melted material of the pad member 5 from flowing into the wall portions 44.

In accordance with the above mentioned construction, the head rest body 3 is supported by frictional force between the friction portion 45 and the stay member 2. The head rest body 3 pivots relative to the stay member 2 in response to a force larger than the frictional force between the friction portion 45 and the stay member 2 in order to adjust the supporting position of the passenger's head.

The rotation of the head rest body 3 is limited in one direction to a position where the stopper portions 22a engage the extension portion 42 and in another direction to a position where the stopper portions 22a engage the body portion 41. A lower end portion of the extension portion 42 is bent in the forward direction of the seat head rest 1 in order to permit the head rest body 3 to be rotated relative to the stay member 2.

Figure 4:
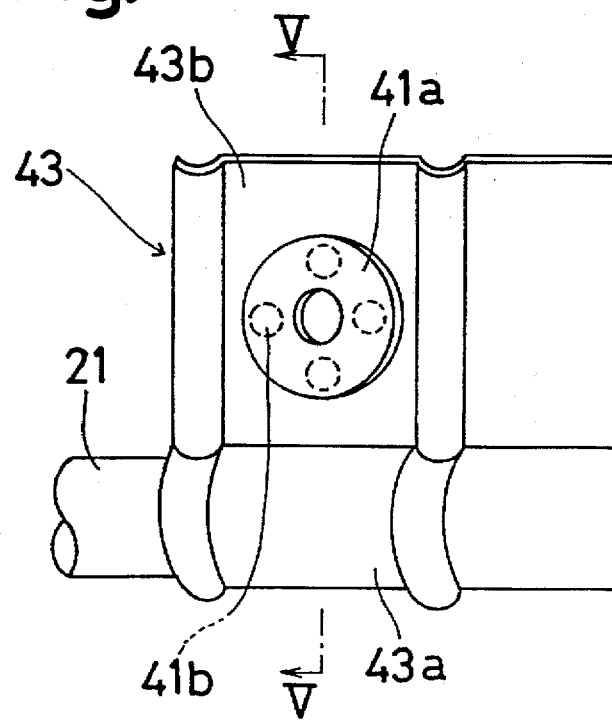
FIG. 4 is an enlarged view of an engaging portion between a stay member and a rigid frame of the seat head rest for a vehicle of the present invention.
Figure 5:
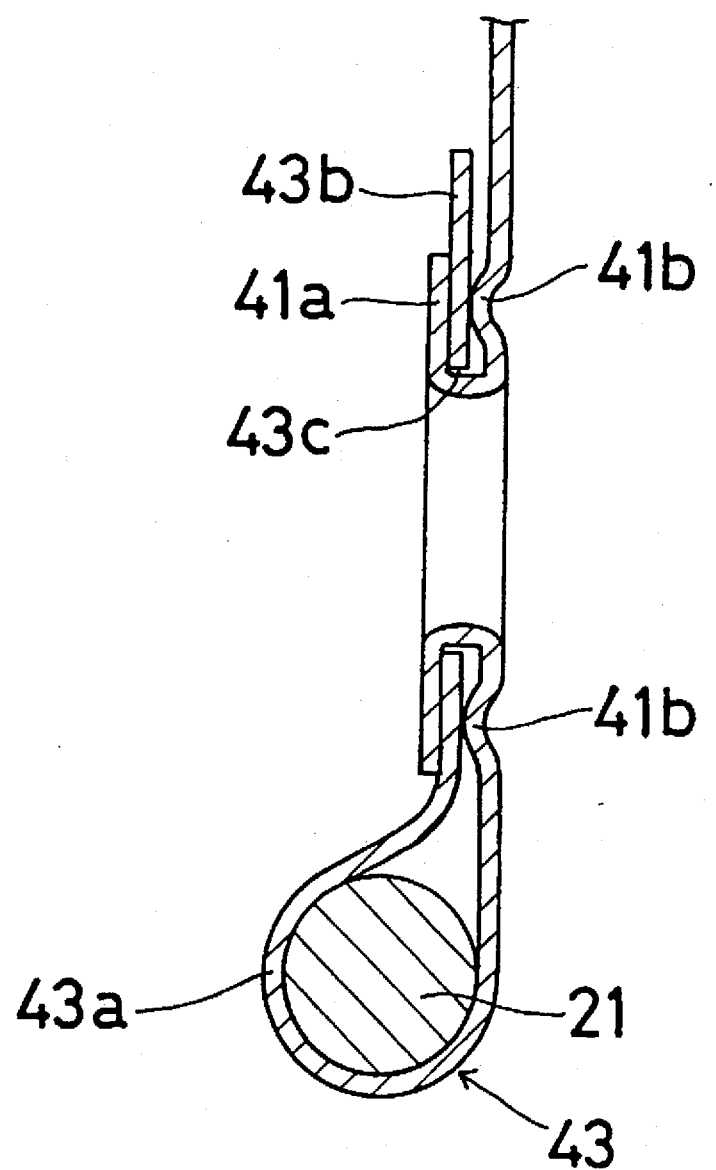
FIG. 5 is a sectional view of a seat head rest for a vehicle of the present invention taken on line V—V of FIG. 4.

As shown in FIGS. 4 and 5, the extension portion 43 includes a curled portion 43a which is formed into a substantially annular configuration, and a connecting portion 43b which is connected to the body portion 41. The curled portion 43a is tightly wound around the horizontal rod portion 21 so as to frictionally engage substantially all except a small portion of the periphery of the horizontal rod portion 21 of the stay 2.

The body portion 41 includes a pair of flange portions 41a each of which is inserted into a through hole 43c provided on the connecting portion 43b and urgingly clamped to the connecting portion 43b. Further, the body portion 41 includes a plurality of projections 41b provided around each of the flange portions 41a so as to be in point contact with the connecting portion 43b.

With the connection between the flange portion 41a and the connecting portion 43b, the friction portion 45 frictionally engages the stay member 2. When the flange portion 41a is urgingly clamped to the connecting portion 43b, the projections 41b are deformed so as to adjust the amount of the frictional force between the circular portion 43a and the horizontal rod portion 21.

Figure 6:
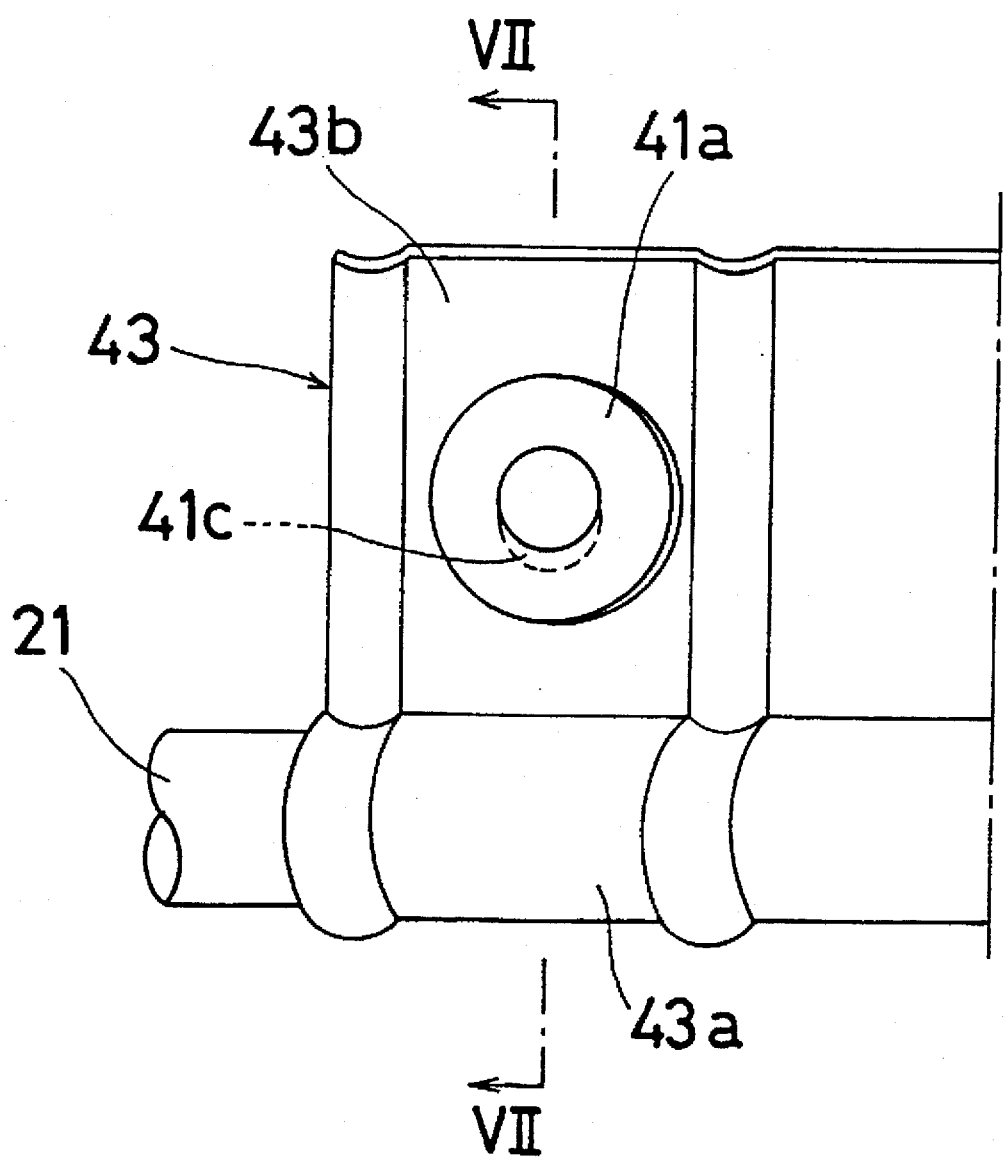
FIG. 6 is an enlarged view of a modification of the engaging portion of the first embodiment between a stay member and a rigid frame of a seat head rest for a vehicle according to the present invention.
Figure 7:
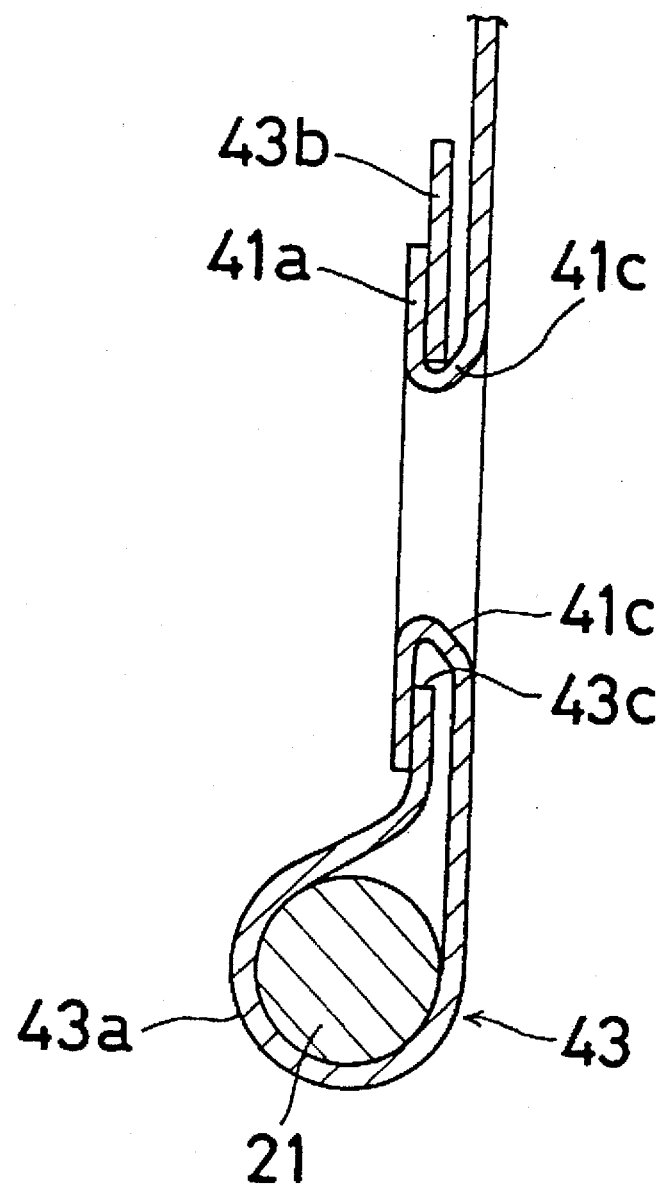
FIG. 7 is a sectional view of a seat head rest for a vehicle of the present invention taken on line VII—VII of FIG. 6.

As shown in FIGS. 6 and 7 the body portion 41 may include a pair of inclined portions 41c instead of the projections 41b. When the flange portion 41a is urgingly clamped to the connecting portion 43b, the inclined portions 41c are deformed so as to adjust the amount of the friction force between the circular or curled portion 43a and the horizontal rod portion 21.

Figure 8:
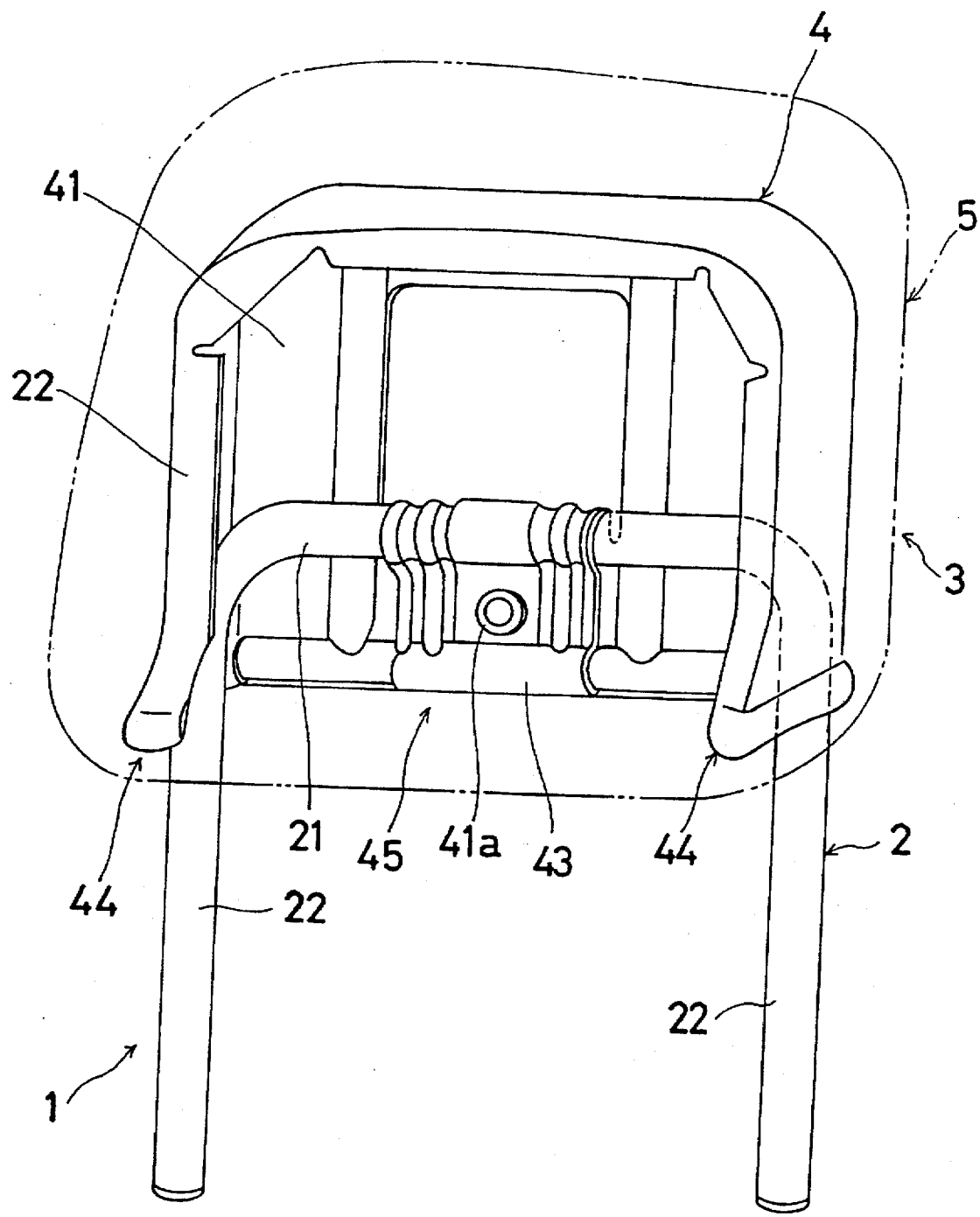
FIG. 8 is a perspective view of a modification of the first embodiment of a Seat head rest for a vehicle of the present invention.
Figure 9:
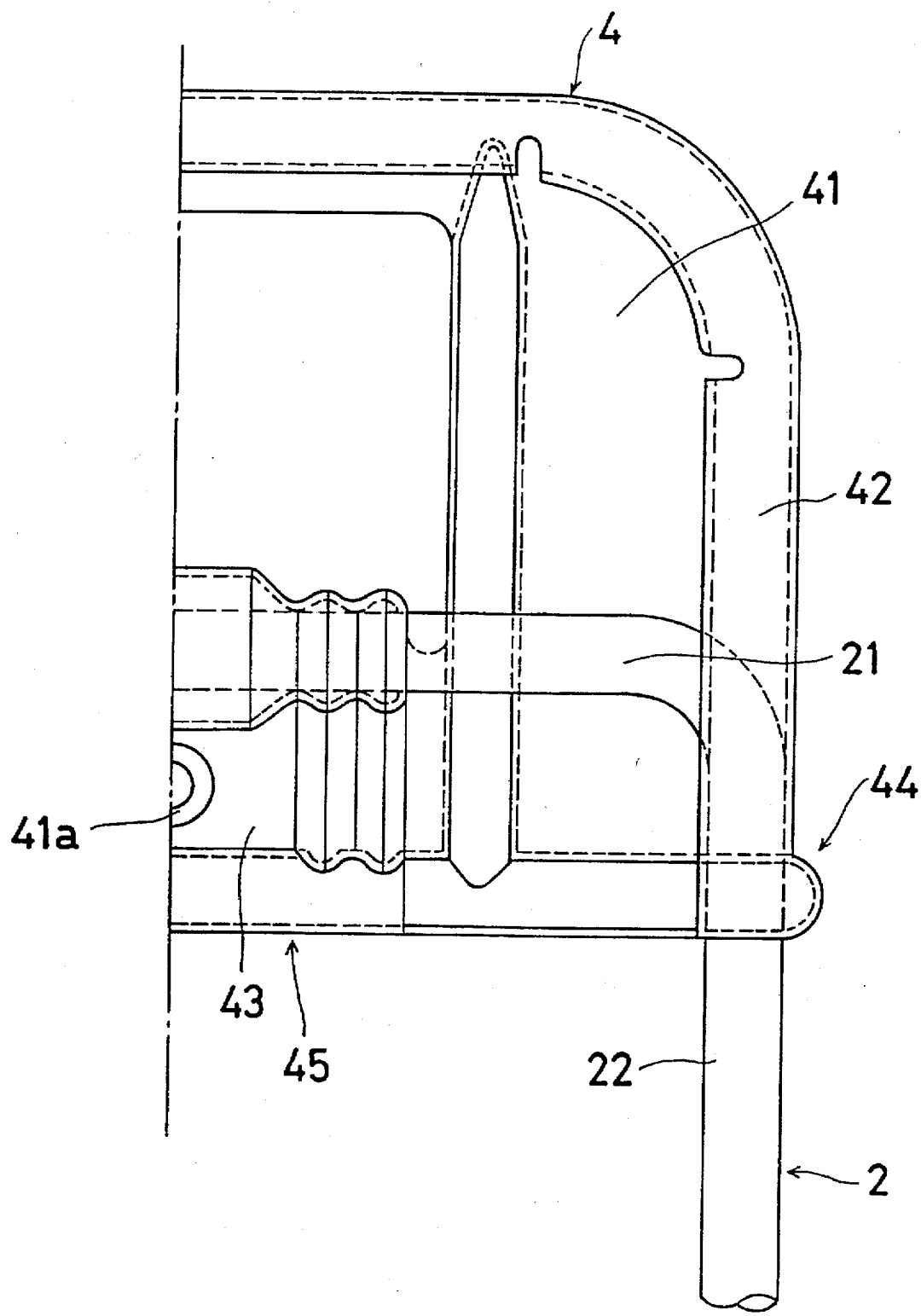
FIG. 9 is an elevational view of FIG. 8.
Figure 10:
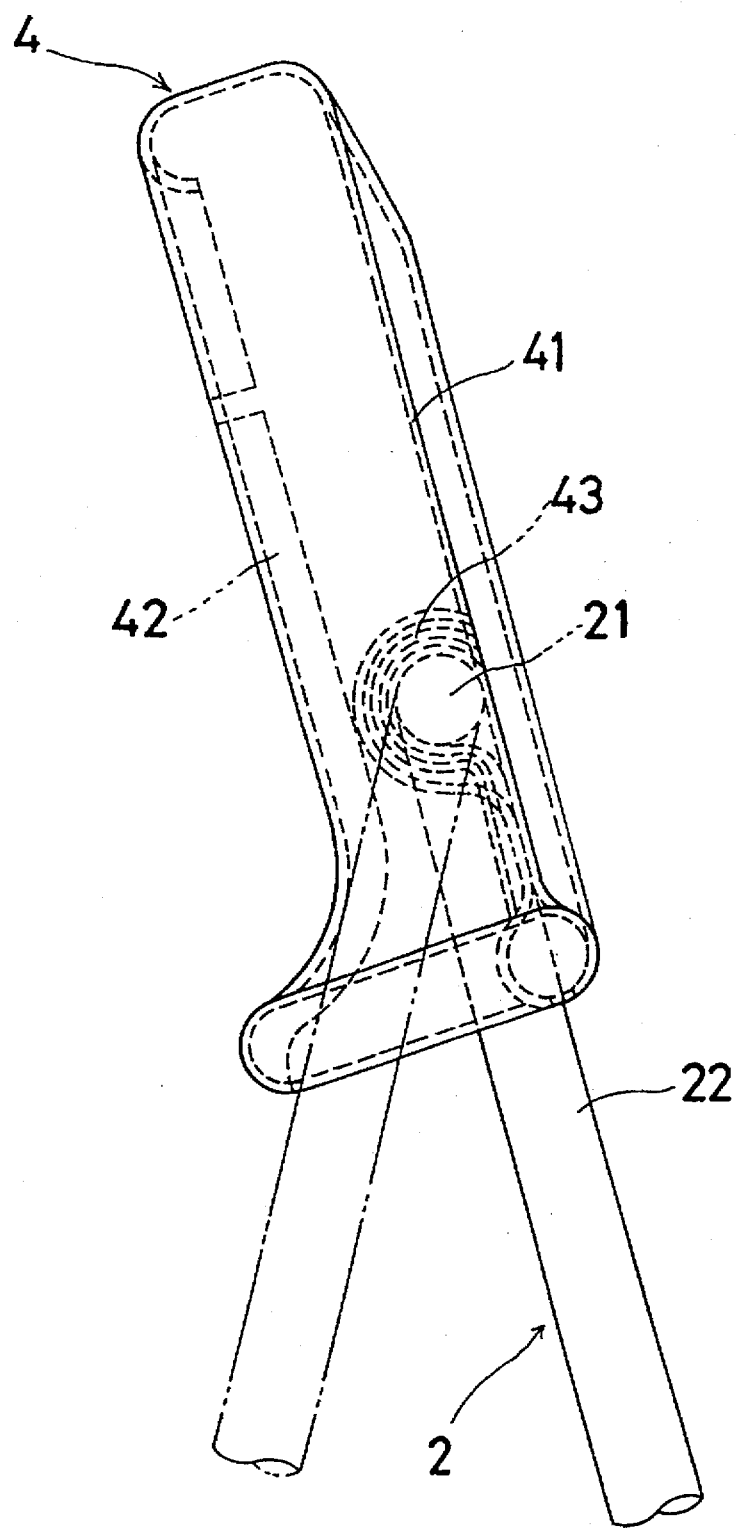
FIG. 10 is a side view of FIG. 8.

As shown in FIGS. 8 to 10 the stopper portions 22a may be omitted. In this case, the vertical rod portions 22 are engageable with the wall portion 44 of the frame 4. Further, the position of the friction portion 45 is higher in the body member than that of the embodiment shown in FIGS. 1 to 3.

Figure 11:
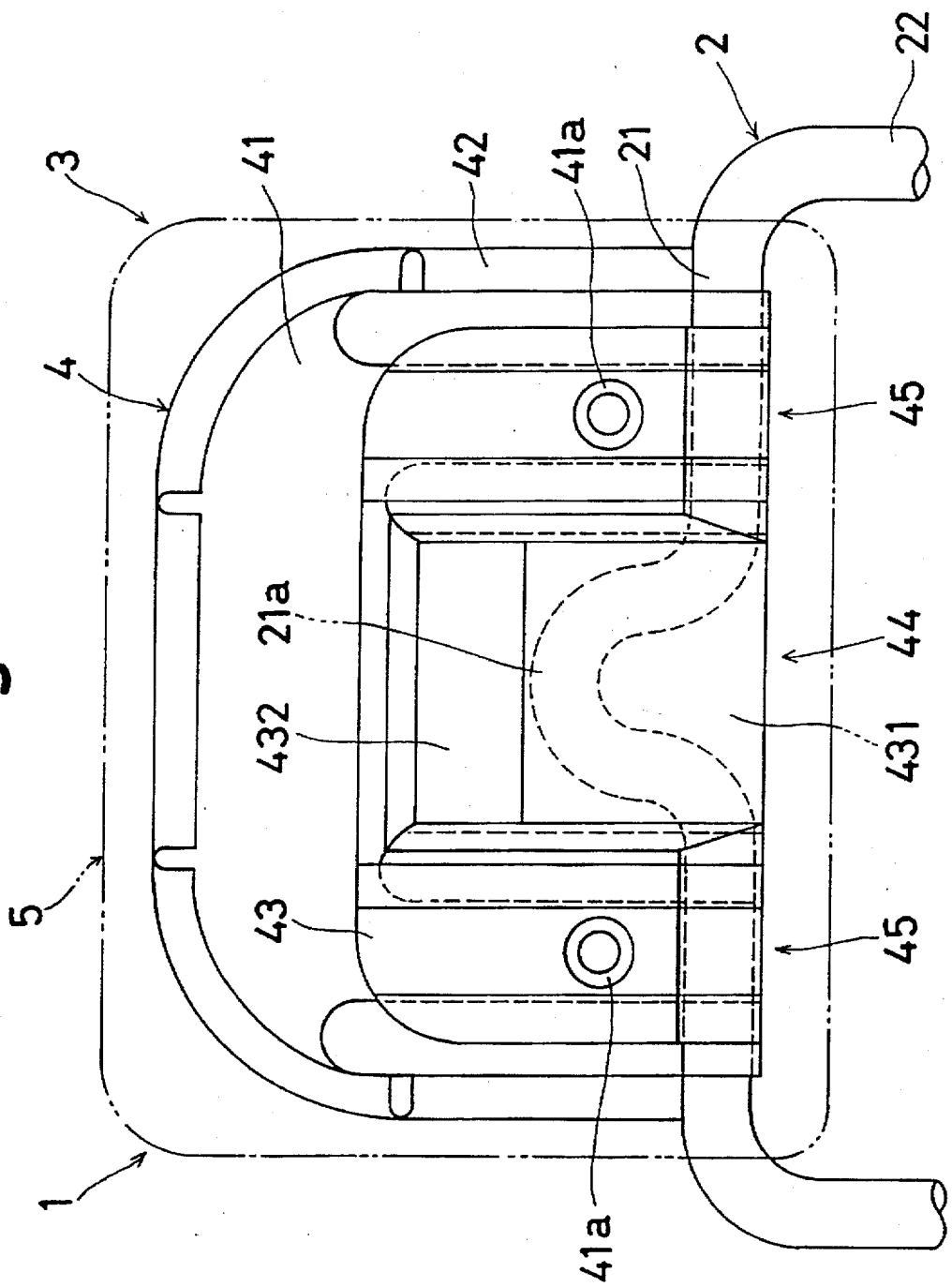
FIG. 11 is an elevational view of a seat head rest for a vehicle according to a second embodiment of the present invention.
Figure 12:
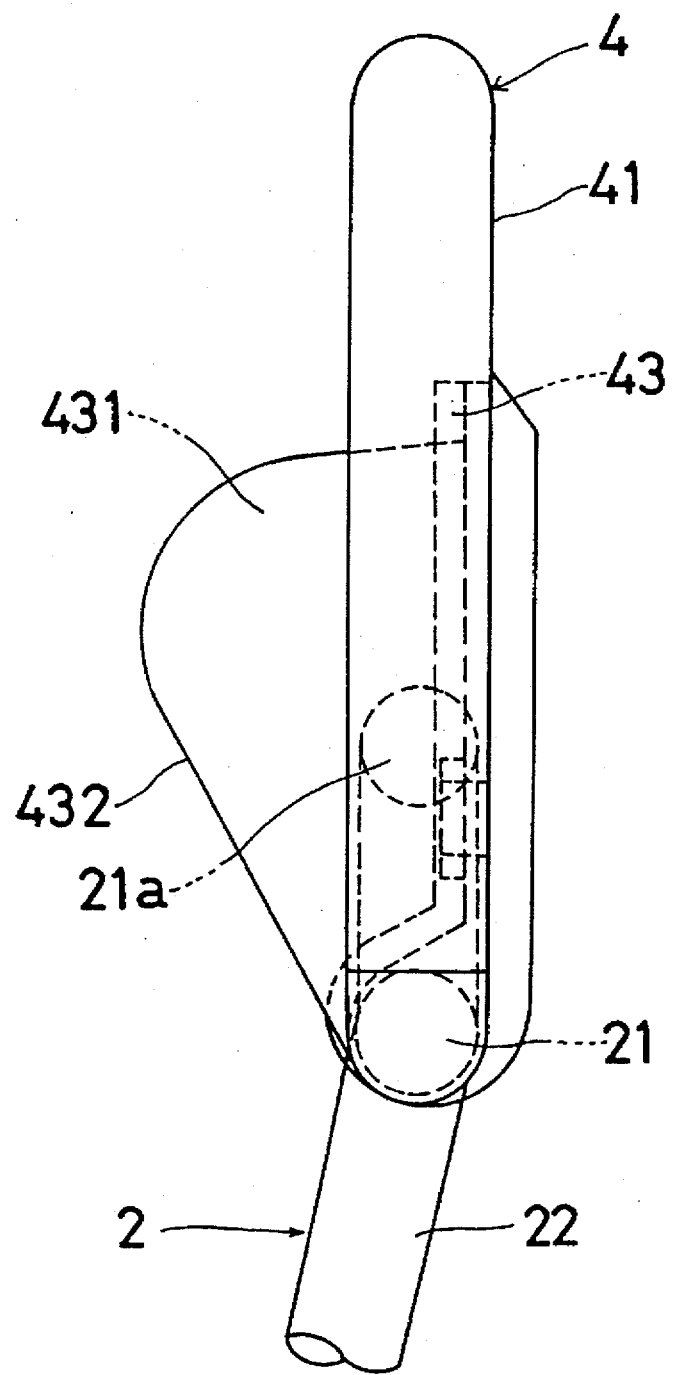
FIG. 12 is a side view of FIG. 11.

A second embodiment of the seat head rest of the invention will be described hereinafter. As shown in FIGS. 11 and 12, the rigid frame 4 formed with a plate member includes a body portion 41, a first extension portion 42 extending from an upper portion of the body portion, a pair of side portions of the body portion 41, and a second extension portion 43 extending from a lower portion of the body portion 41, which are integrally formed with each other. The extension portion 42 is bent in the forward direction of the seat head rest 1 so as to form the frame 4 into a box shape without an edge portion. The extension portion 43 is curved or curled in the forward direction of the seat head rest 1. The extension portion 43 further includes a rising portion 432 so as to establish a concave portion 431 in the frame 4.

The horizontal rod portion 21 of the stay member 2 includes a stopper portion 21a integrally formed between a pair of spaced horizontal rod portions constituting the horizontal rod portion 21. The stopper portion 21a projects in the upper direction from an axis of the horizontal rod portion 21.

The supporting portion 43 of the frame 4 is wound around each of the spaced horizontal rod portions of the horizontal rod portion 21 to mount the frame 4 on the stay member 2. The extension portion 43 includes a curling or curved portion 43a and a connecting portion 43b similar to the first embodiment. The stopper portion 21a is located in the concave portion 431.

A clearance between the body portion 41 and the rising portion 432 in the forward and the rear direction is larger than the thickness of the stopper portion 21a. A pair of friction portions 45 of the extension portion 43 frictionally engage the horizontal portions 21 of the horizontal rod portion.

The head rest body 3 is pivotally mounted on the stay member 2. Further, the extension portion 42 includes a wall portion 44 engageable with the stay member 2 by the rotation of the head rest body 3 relative to the stay member 2.

In accordance with the above mentioned construction, the head rest body 3 is supported by the frictional forces between each of the friction portions 45 and the stay member 2. The head rest body 3 is pivoted relative to the stay member 2 in response to a force larger than the frictional forces between each of the friction portions 45 and the stay member 2 in order to adjust the supporting position of the passenger's head.

The rotation of the head rest body 3 is limited in one direction to a position where the stopper portion 21a engages the rising portion 432 of the extension portion 43 and in the opposite direction to a position where the stopper portion 21a engages the body portion 41.

The structures shown in FIGS. 4 to 7 can be applied to the second embodiment similar to the first embodiment of the seat head rest 1. In accordance with the above construction, the wall portion 44 is integrally formed with the friction portions 45. However, the wall portion 44 and the friction portions 45 may be separated from each other.

A third embodiment, which differs from the second embodiment of the seat head rest 1 of the invention, will be described hereinafter.

Figure 13:
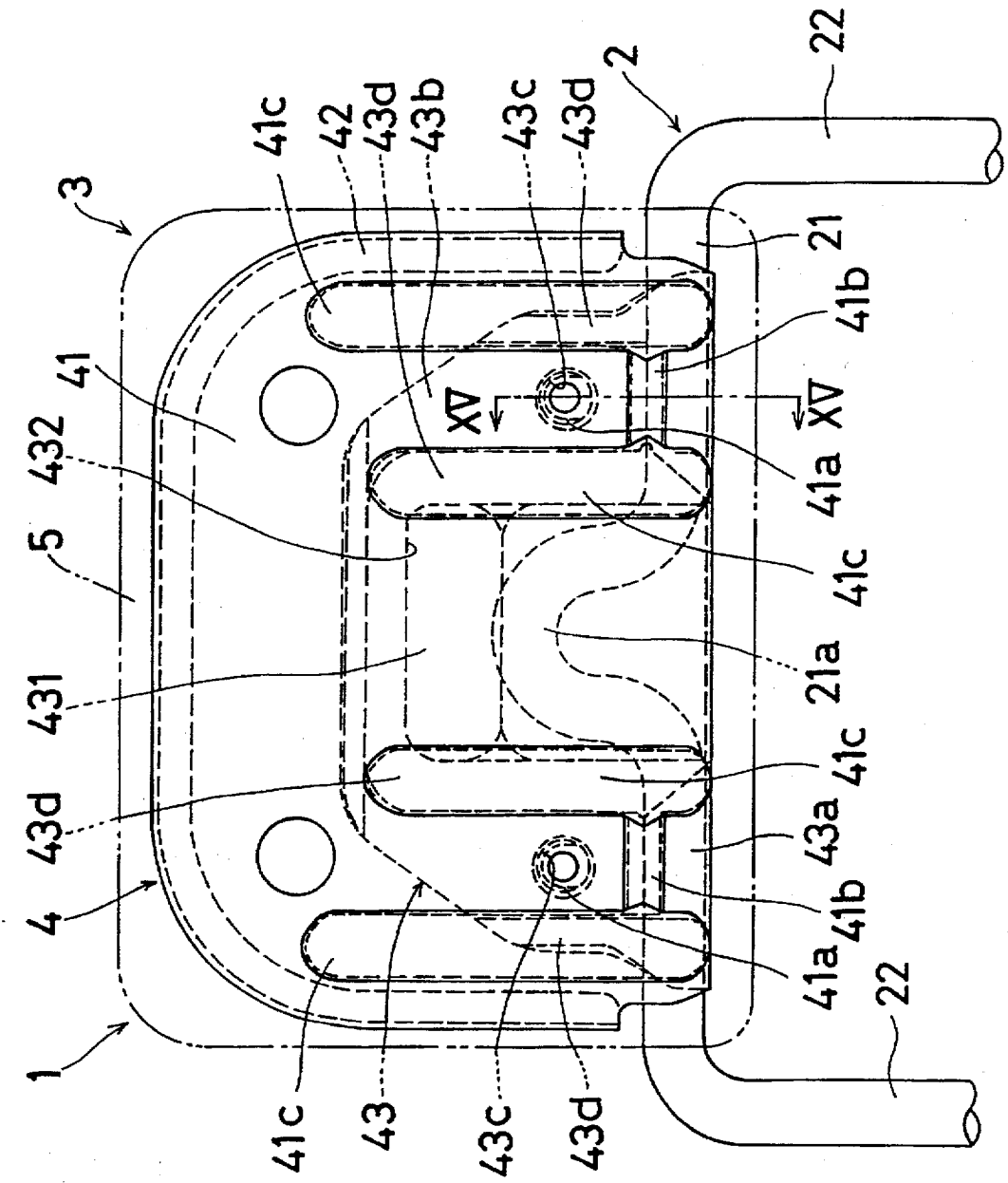
FIG. 13 is an elevational view of a third embodiment of a seat head rest for a vehicle of the present invention.
Figure 14:
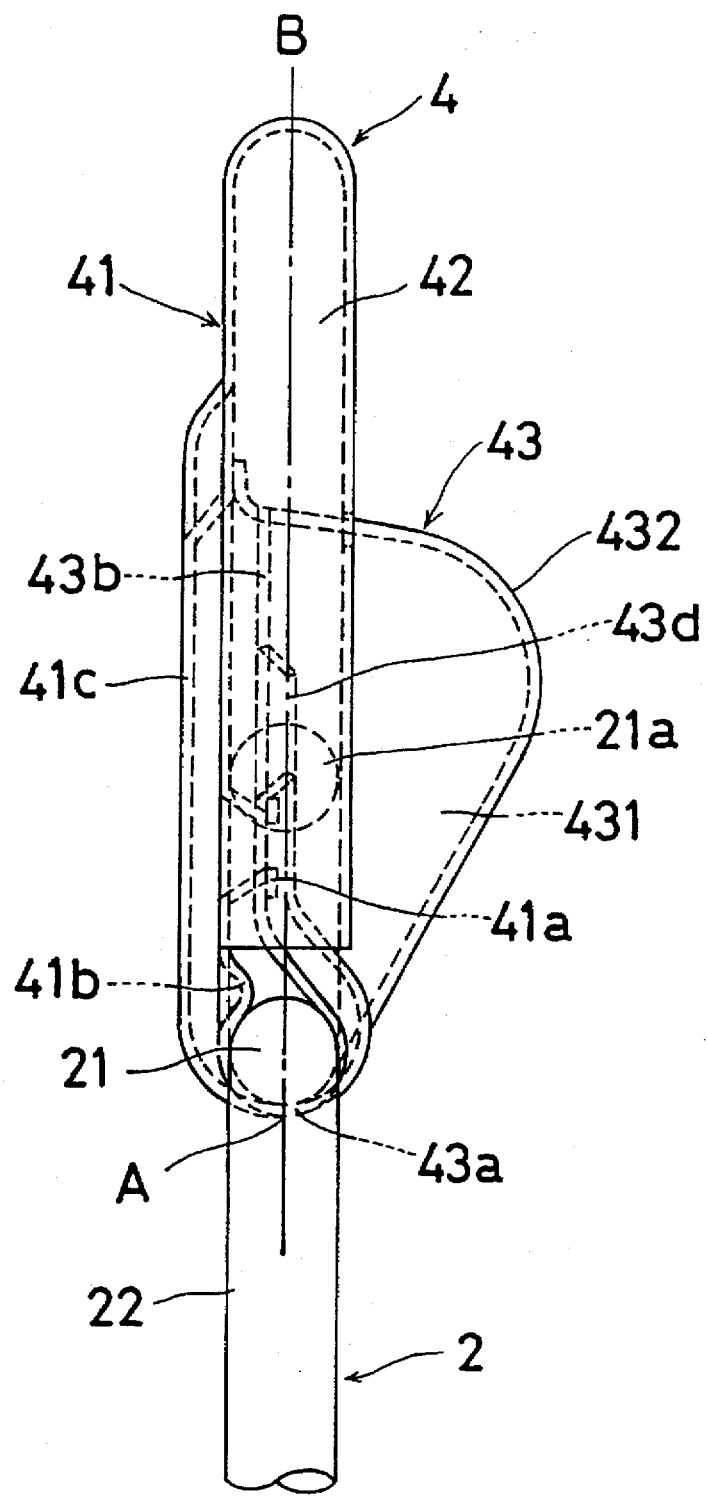
FIG. 14 is a side view of FIG. 13.
Figure 15:
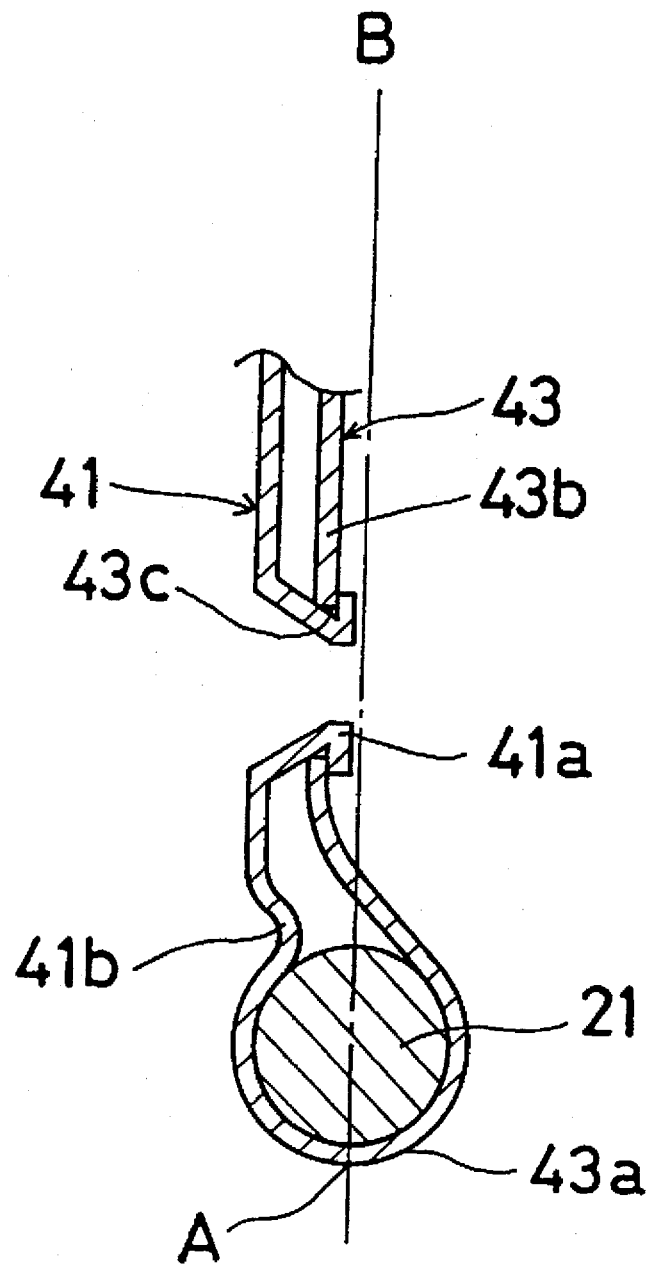
FIG. 15 is a sectional view of a seat heat rest for a vehicle of the present invention taken on line XV—XV of FIG. 13.

As shown in FIGS. 13 to 15, the extension portion 42 is bent in the rear direction (the right direction as viewed in FIG. 14) of the seat head rest 1 so as to form the frame 4 into a box shape without an edge portion. The extension portion 43 is curled in the rear direction (the right direction as viewed in FIG. 14) of the seat head rest.

The body portion 41 includes a pair of first rib portions 41b each of which projects in the rear direction of the seat head rest 1. Each of the rib portions 41b grasps the horizontal rod portion 21 with the circular portion 43a. When the extension portion 43 is curled around the horizontal rod portions 21, the rib portions 41b prevent the extension portion 43 from being moved relative to the horizontal rod portions 21 so as to establish sufficient friction forces between the friction portions 45 and the horizontal rod portions 21.

As shown in FIGS. 13 and 14, the body portion 41 includes a pair of second rib portions 41c each of which extends in the vertical direction as viewed in FIGS. 13 and 14 and projects in the forward direction of the seat head rest 1. Further, the extension portion 43 includes a pair of third rib portions 43d, each of which extends in the vertical direction of FIGS. 13 and 14 and projects in the rear direction of the seat head rest. The second rib portions 41c and the third rib portions 43d increase the rigidity of the frame 4.

The second rib portions 41c and the third rib portions 43d are opposite each other. Further, lower end portions of the second rib portions 41c and the third rib portions 43d are also opposite each other. A fulcrum A caused by the elastic deformation of the curling portion 43a is disposed between the lower end portions of the second rib portion 41c and the corresponding third rib portion 43d. The connecting portions 43b of extension portion 43 are located so as to be a predetermined distance offset from the axis of the stay member 2, which is represented by a vertical line B, which passes through the elastic fulcrum A in the forward direction, which is the left direction as viewed in FIGS. 14 and 15) of the seat head rest for a vehicle 1.

When the head rest body 3 is rotated in the forward direction of the seat head rest 1 (the counterclockwise direction of FIG. 14) in order to adjust the supporting position of the passenger's head, the curling portions 43a are elastically deformed by leverage so as to reduce a thrust force to the horizontal rod portions 21 because the connecting portions 43b are located so as to be a predetermined distance offset from the elastic fulcrum A in the forward direction of the seat head rest. Therefore, the frictional force between the curling portion 43a and the horizontal rod portion 21 is reduced to below a predetermined value. That is to say, the resistance force of the rotation of the head rest body 3 in the forward direction of the seat head rest 1 relative to the stay member 2 is reduced so as to facilitate the operation of the seat head rest.

When the passenger's head is supported by the head rest body 3, the head rest body 3 is forced so as to be rotated in the rearwardly direction (the clockwise direction of FIG. 14) of the seat head rest. At this time, the curling portions 43a are elastically deformed by leverage so as to increase the thrust force to the horizontal rod portions 21 because the connecting portions 43b are located a predetermined distance offset from the elastic fulcrum A in the forward direction of the seat headrest 1. Therefore, the frictional force between the curling portion 43a and the horizontal rod portion 21 is increased to be above a predetermined value. That is to say, the resistance force of the rotation of the head rest body 3 in the rearward direction of the seat head rest relative to the stay member 2 is increased so as to firmly support the passenger's head.

In accordance with the above structure, the extension portion 43 is integrally formed with the body portion 41. However, a member corresponding to the extension portion 43 may be fixed to the body portion 41.

In accordance with the invention, since the frame includes the second extension portion frictionally engaging the stay member, the head rest body can be rotated relative to the stay member without any additional friction member. Therefore, the number of the parts of the seat head rest can be reduced, thus reducing the cost.

Since the wall portion is integrally formed with the frame, the rotation of the head rest body is limited by the engagement of the wall portion with the stay member.

In accordance with the invention, since the stopper portion to be engageable with the wall portion projects from the rotational axis of the stay member in the upper direction, the rotational axis of the stay member can be located at the lower end of the head rest body. Therefore, although a predetermined rotation angle of the head rest body is secured, an opening space of the head rest body positioned around the vertical rod portions of the stay member can be reduced.

In accordance with the third embodiment of the seat head rest for a vehicle, the frictional force between the friction portion and the rod portion is varied according to the rotational direction of the frame relative to the stay member in order to vary the resistance force of the rotation of the frame relative to the stay member.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A seat head rest for a vehicle, comprising: a stay member for mounting on a seat back and including a pair of vertical rod portions and a horizontal rod portion connected to the vertical rod portions;

a frame pivotably mounted on the stay member and including at least a wall portion engageable with the stay member and a friction portion extending from a lower portion of the frame and being curled so as to be wound around the horizontal portion of the stay, the frame being formed with a plate member which is untarily formed with the wall portion and the friction portion; and a pad member fixed to the frame and forming a head rest body with the frame.

2. A seated rest for a vehicle as recited in claim 1, wherein the frame includes a body portion, a first extension portion extending from a pair of side portions of the body portion, a second extension portion extending from a lower portion of the body portion formed of a plate member, the second extension portion including a friction portion formed by curling the second extension portion to be wound around the horizontal rod portion.

3. A seat head rest for a vehicle as recited in claim 2, wherein the horizontal rod portion includes a pair of stopper portions each of which is engageable with the wall portion and bent to project from a pivotal axis of the head rest body.

4. A seat head rest for a vehicle as recited in claim 1, wherein the frame includes a body portion, a first extension portion extending from a pair of side portions of the body portion, a second extension portion extending from a lower portion of the body portion formed of a plate member, the second extension portion including a pair of friction portions to be wound around the horizontal rod portions.

5. A seat head rest for a vehicle as recited in claim 4 wherein the stay member includes a stopper portion engageable with the wall portion and bent to project from a pivotal axis of the head rest body.

6. A seat head rest according to claim 1, wherein
the friction portion is integrally formed with the frame and frictionally engages the stay member, said friction portion including at least one elastic fulcrum partially curled around a portion of the stay member to permit pivoting the stay member about an axis and frictionally engage the stay member, and including a connecting member spaced from the at least one elastic fulcrum and offset from the axis of the stay member to clamp the at least one elastic fulcrum to the stay member and generate frictional force between said at least one elastic fulcrum and the stay member.

7. A seat head rest for a vehicle comprising:

a stay member, including pair of horizontal rod portion and a pair of vertical rod portions, for mounting on a seat back, a frame being a plate member with an integral wall, said wall having a body portion with a pair of side portions, and a first extension portion and a second extension portion, the first extension portion extending from the pair of side portions, the second extension portion extending from a lower portion of the body portion and including a friction portion curled around the horizontal rod portion frictionally engaging the stay member and pivotably mounted on the stay member, the second extension portion being clamped to the body portion to generate frictional force between the friction portion and the horizontal rod portion, at least one of the second extension portions and the body portion including a deformable projection for adjusting the frictional force between the friction portion and the horizontal rod portion, and a pad member fixed to the frame and forming a head rest body with the frame.

8. A seat head rest for a vehicle according to claim 7, wherein the friction portion of the extension portion has at least one rib engaging the horizontal portion of the stay to establish friction between the friction portion and the horizontal portion of the stay.

9. A seat head rest for a vehicle according to claim 8, wherein the frame comprises:

a first plurality of spaced ribs projecting forwardly and extending in a vertical direction;

a second plurality of spaced ribs projecting rearwardly and extending in a vertical direction; and at least one rib extending horizontally and projecting rearwardly in the space between the vertical extending ribs engaging the horizontal portion of the stay to establish friction between the frictional portion and the horizontal portion of the stay.

10. A seat head rest for a vehicle comprising:

a stay member including a horizontal rod portion and a pair of vertical rod portions, for mounting on a seat back, a frame being a plate member with an integral wall, said wall having a body portion and a first extension portion and a second extension portion, the first extension portion extending from a pair of side portions of the body portion, the second extension portion extending from a lower portion of the body portion and including a friction portion curled around and engaging the horizontal rod portion of the stay member, the second extension portion being clamped to the body portion to generate frictional force between the friction portion and the horizontal rod portion, at least one of the second extension portions and the body portion including a projection deformable by clamping the second extension portion to the body portion to adjust the frictional forces between the friction portion and the horizontal rod portion, and a pad member fixed to the frame and forming a head rest body with the frame.

11. A seat head rest for a vehicle according to claim 10, wherein the extension portion of the frame has a plurality of ribs projecting both forwardly and rearwardly and spaced from the frictional portion to stiffen the frame.

12. A seat head rest for a vehicle, comprising:

a stay member, including a pair of horizontal rod portions, for mounting on a seat back;

a frame being a plate member having a body portion and an extension portion extending from the body portion;

a pad member fixed to the frame and forming a head rest body with the frame, said extension portion including an integral friction portion having an elastic fulcrum curled around each of the horizontal rod portions to pivotably and frictionally engage the stay member, the extension portion including a connecting portion, spaced from each of the respective elastic fulcrums in a direction forward of the headrest body, clamping the extension portion to the body portion for generating frictional forces between the friction portions and the horizontal rod portions.

* * * * *

UNITED STATES PATENT AND TRADEMARK OFFICE
CERTIFICATE OF CORRECTION

PATENT NO.: 5,683,141

DATED: November 4, 1997

INVENTOR(S): Wakamatsu et al.

It is certified that an error appears in the above-identified patent and that said Letters Patent is hereby corrected as shown below:

On the title page:
    Item, [73] Assignee - change "AISIN SEKI KABUSHIKI KAISHA" to

--AISIN SEIKI KABUSHIKI KAISHA--.

Claim 2, col. 6, line 45 - change "a seated rest" to --a seat head rest--.

Signed and Sealed this

Nineteenth Day of May, 1998

*Attest:*

BRUCE LEHMAN

*Attesting Officer*      *Commissioner of Patents and Trademarks*